US010310113B2

(12) United States Patent
Sun et al.

(10) Patent No.: US 10,310,113 B2
(45) Date of Patent: Jun. 4, 2019

(54) Q-COMPENSATED FULL WAVEFIELD INVERSION (71) Applicants: Hongchuan Sun, Spring, TX (US); Eric G. Wildermuth, Spring, TX (US); Jonathan Liu, Houston, TX (US); Reeshidev Bansal, Spring, TX (US); Spyridon K. Lazaratos, Houston, TX (US)

(72) Inventors: Hongchuan Sun, Spring, TX (US); Eric G. Wildermuth, Spring, TX (US); Jonathan Liu, Houston, TX (US); Reeshidev Bansal, Spring, TX (US); Spyridon K. Lazaratos, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 166 days.

(21) Appl. No.: 15/251,313

(22) Filed: Aug. 30, 2016

(65) Prior Publication Data
US 2017/0097428 A1 Apr. 6, 2017

Related U.S. Application Data (60) Provisional application No. 62/236,190, filed on Oct. 2, 2015.

(51) Int. Cl.
*G01V 1/28* (2006.01)
*G01V 1/30* (2006.01)
*G01V 1/36* (2006.01)
(52) U.S. Cl.
CPC ............. *G01V 1/282* (2013.01); *G01V 1/303* (2013.01); *G01V 1/362* (2013.01); *G01V 1/306* (2013.01);
(Continued)

(58) Field of Classification Search
CPC ..... G01V 1/282; G01V 1/303; G01V 2210/51
See application file for complete search history.

(56) References Cited

U.S. PATENT DOCUMENTS 3,812,457 A 5/1974 Weller
3,864,667 A 2/1975 Bahjat
(Continued)

FOREIGN PATENT DOCUMENTS

CA 2 796 631 11/2011
EP 1 094 338 4/2001
(Continued)

OTHER PUBLICATIONS

Bear, L et al. (Nov. 9, 2008), "Efficient compensation for attenuation effects using pseudo Q migration," SEG Las Vegas 2008 Annual Meeting, XP007906731, pp. 2206-2210.
(Continued)

*Primary Examiner* — Michael J Dalbo
(74) *Attorney, Agent, or Firm* — ExxonMobil Upstream Research Company Law Department (57) ABSTRACT A method, including: obtaining a velocity model generated by an acoustic full wavefield inversion process; generating, with a computer, a variable Q model by applying pseudo-Q migration on processed seismic data of a subsurface region, wherein the velocity model is used as a guided constraint in the pseudo-Q migration; and generating, with a computer, a final subsurface velocity model that recovers amplitude attenuation caused by gas anomalies in the subsurface region by performing a visco-acoustic full wavefield inversion process, wherein the variable Q model is fixed in the visco-acoustic full wavefield inversion process.

11 Claims, 6 Drawing Sheets (52) U.S. Cl.
CPC .. *G01V 2210/512* (2013.01); *G01V 2210/584* (2013.01); *G01V 2210/74* (2013.01)

(56) References Cited

U.S. PATENT DOCUMENTS

| | | | |
|---|---|---|---|
| 4,159,463 A | 6/1979 | Silverman | |
| 4,168,485 A | 9/1979 | Payton et al. | |
| 4,545,039 A | 10/1985 | Savit | |
| 4,562,650 A | 1/1986 | Nagasawa et al. | |
| 4,575,830 A | 3/1986 | Ingram et al. | |
| 4,594,662 A | 6/1986 | Devaney | |
| 4,636,957 A | 1/1987 | Vannier et al. | |
| 4,675,851 A | 6/1987 | Savit et al. | |
| 4,686,654 A | 8/1987 | Savit | |
| 4,694,404 A | 9/1987 | Meagher | 364/518 |
| 4,707,812 A | 11/1987 | Martinez | |
| 4,715,020 A | 12/1987 | Landrum, Jr. | |
| 4,766,574 A | 8/1988 | Whitmore et al. | |
| 4,780,856 A | 10/1988 | Becquey | |
| 4,823,326 A | 4/1989 | Ward | |
| 4,924,390 A | 5/1990 | Parsons et al. | |
| 4,953,657 A | 9/1990 | Edington | |
| 4,969,129 A | 11/1990 | Currie | |
| 4,982,374 A | 1/1991 | Edington et al. | |
| 5,260,911 A | 11/1993 | Mason et al. | |
| 5,469,062 A | 11/1995 | Meyer, Jr. | |
| 5,583,825 A | 12/1996 | Carrazzone et al. | |
| 5,677,893 A | 10/1997 | de Hoop et al. | |
| 5,715,213 A | 2/1998 | Allen | |
| 5,717,655 A | 2/1998 | Beasley | |
| 5,719,821 A | 2/1998 | Sallas et al. | |
| 5,721,710 A | 2/1998 | Sallas et al. | |
| 5,790,473 A | 8/1998 | Allen | |
| 5,798,982 A | 8/1998 | He et al. | |
| 5,822,269 A | 10/1998 | Allen | |
| 5,838,634 A | 11/1998 | Jones et al. | |
| 5,852,588 A | 12/1998 | de Hoop et al. | |
| 5,878,372 A | 3/1999 | Tabarovsky et al. | |
| 5,920,838 A | 7/1999 | Norris et al. | |
| 5,924,049 A | 7/1999 | Beasley et al. | |
| 5,999,488 A | 12/1999 | Smith | |
| 5,999,489 A | 12/1999 | Lazaratos | |
| 6,014,342 A | 1/2000 | Lazaratos | |
| 6,021,094 A | 2/2000 | Ober et al. | |
| 6,028,818 A | 2/2000 | Jeffryes | |
| 6,058,073 A | 5/2000 | VerWest | |
| 6,125,330 A | 9/2000 | Robertson et al. | |
| 6,219,621 B1 | 4/2001 | Hornbostel | |
| 6,225,803 B1 | 5/2001 | Chen | |
| 6,311,133 B1 | 10/2001 | Lailly et al. | |
| 6,317,695 B1 | 11/2001 | Zhou et al. | |
| 6,327,537 B1 | 12/2001 | Ikelle | |
| 6,374,201 B1 | 4/2002 | Grizon et al. | |
| 6,381,543 B1 | 4/2002 | Guerillot et al. | |
| 6,388,947 B1 | 5/2002 | Washbourne et al. | |
| 6,480,790 B1 | 11/2002 | Calvert et al. | |
| 6,522,973 B1 | 2/2003 | Tonellot et al. | |
| 6,545,944 B2 | 4/2003 | de Kok | |
| 6,549,854 B1 | 4/2003 | Malinverno et al. | |
| 6,574,564 B2 | 6/2003 | Lailly et al. | |
| 6,593,746 B2 | 7/2003 | Stolarczyk | |
| 6,662,147 B1 | 12/2003 | Fournier et al. | |
| 6,665,615 B2 | 12/2003 | Van Riel et al. | |
| 6,687,619 B2 | 2/2004 | Moerig et al. | |
| 6,687,659 B1 | 2/2004 | Shen | |
| 6,704,245 B2 | 3/2004 | Becquey | |
| 6,714,867 B2 | 3/2004 | Meunier | |
| 6,735,527 B1 | 5/2004 | Levin | |
| 6,754,590 B1 | 6/2004 | Moldoveanu | |
| 6,766,256 B2 | 7/2004 | Jeffryes | |
| 6,826,486 B1 | 11/2004 | Malinverno | |
| 6,836,448 B2 | 12/2004 | Robertsson et al. | |
| 6,842,701 B2 | 1/2005 | Moerig et al. | |
| 6,859,734 B2 | 2/2005 | Bednar | |
| 6,865,487 B2 | 3/2005 | Charron | |
| 6,865,488 B2 | 3/2005 | Moerig et al. | |
| 6,876,928 B2 | 4/2005 | Van Riel et al. | |
| 6,882,938 B2 | 4/2005 | Vaage et al. | |
| 6,882,958 B2 | 4/2005 | Schmidt et al. | |
| 6,901,333 B2 | 5/2005 | Van Riel et al. | |
| 6,903,999 B2 | 6/2005 | Curtis et al. | |
| 6,905,916 B2 | 6/2005 | Bartsch et al. | |
| 6,906,981 B2 | 6/2005 | Vauge | |
| 6,927,698 B2 | 8/2005 | Stolarczyk | |
| 6,944,546 B2 | 9/2005 | Xiao et al. | |
| 6,947,843 B2 | 9/2005 | Fisher et al. | |
| 6,950,786 B1 | 9/2005 | Sonneland et al. | 703/2 |
| 6,970,397 B2 | 11/2005 | Castagna et al. | |
| 6,977,866 B2 | 12/2005 | Huffman et al. | |
| 6,999,880 B2 | 2/2006 | Lee | |
| 7,046,581 B2 | 5/2006 | Calvert | |
| 7,050,356 B2 | 5/2006 | Jeffryes | |
| 7,069,149 B2 | 6/2006 | Goff et al. | |
| 7,027,927 B2 | 7/2006 | Routh et al. | |
| 7,072,767 B2 | 7/2006 | Routh et al. | |
| 7,092,823 B2 | 8/2006 | Lailly et al. | |
| 7,110,900 B2 | 9/2006 | Adler et al. | |
| 7,184,367 B2 | 2/2007 | Yin | |
| 7,230,879 B2 | 6/2007 | Herkenoff et al. | |
| 7,271,747 B2 | 9/2007 | Baraniuk et al. | |
| 7,330,799 B2 | 2/2008 | Lefebvre et al. | |
| 7,337,069 B2 | 2/2008 | Masson et al. | |
| 7,373,251 B2 | 5/2008 | Hamman et al. | |
| 7,373,252 B2 | 5/2008 | Sherrill et al. | |
| 7,376,046 B2 | 5/2008 | Jeffryes | |
| 7,376,539 B2 | 5/2008 | Lecomte | |
| 7,400,978 B2 | 7/2008 | Langlais et al. | |
| 7,436,734 B2 | 10/2008 | Krohn | |
| 7,480,206 B2 | 1/2009 | Hill | |
| 7,584,056 B2 | 9/2009 | Koren | |
| 7,599,798 B2 | 10/2009 | Beasley et al. | |
| 7,602,670 B2 | 10/2009 | Jeffryes | |
| 7,616,523 B1 | 11/2009 | Tabti et al. | |
| 7,620,534 B2 | 11/2009 | Pita et al. | |
| 7,620,536 B2 | 11/2009 | Chow | |
| 7,646,924 B2 | 1/2010 | Donoho | |
| 7,672,194 B2 | 3/2010 | Jeffryes | |
| 7,672,824 B2 | 3/2010 | Dutta et al. | |
| 7,675,815 B2 | 3/2010 | Saenger et al. | |
| 7,679,990 B2 | 3/2010 | Herkenhoff et al. | |
| 7,684,281 B2 | 3/2010 | Vaage et al. | |
| 7,710,821 B2 | 5/2010 | Robertsson et al. | |
| 7,715,985 B2 | 5/2010 | Van Manen et al. | |
| 7,715,986 B2 | 5/2010 | Nemeth et al. | |
| 7,725,266 B2 | 5/2010 | Sirgue et al. | |
| 7,791,980 B2 | 9/2010 | Robertsson et al. | |
| 7,835,072 B2 | 11/2010 | Izumi | |
| 7,840,625 B2 | 11/2010 | Candes et al. | |
| 7,940,601 B2 | 5/2011 | Ghosh | |
| 8,121,823 B2 | 2/2012 | Krebs et al. | |
| 8,248,886 B2 | 8/2012 | Neelamani et al. | |
| 8,428,925 B2 | 4/2013 | Krebs et al. | |
| 8,437,998 B2 | 5/2013 | Routh et al. | |
| 8,547,794 B2 | 10/2013 | Gulati et al. | |
| 8,688,381 B2 | 4/2014 | Routh et al. | |
| 8,781,748 B2 | 7/2014 | Laddoch et al. | |
| 2002/0049540 A1 | 4/2002 | Beve et al. | |
| 2002/0099504 A1 | 7/2002 | Cross et al. | |
| 2002/0120429 A1 | 8/2002 | Ortoleva | |
| 2002/0183980 A1 | 12/2002 | Guillaume | |
| 2004/0199330 A1 | 10/2004 | Routh et al. | |
| 2004/0225438 A1 | 11/2004 | Okoniewski et al. | |
| 2005/0120013 A1 | 6/2005 | Chang et al. | 707/4 |
| 2006/0104158 A1* | 5/2006 | Walls | G01V 1/30 367/73 |
| 2006/0235666 A1 | 10/2006 | Assa et al. | |
| 2007/0036030 A1 | 2/2007 | Baumel et al. | |
| 2007/0038691 A1 | 2/2007 | Candes et al. | |
| 2007/0064530 A1* | 3/2007 | Moore | G01V 1/364 367/38 |
| 2007/0226158 A1 | 9/2007 | Wornow et al. | 706/17 |
| 2007/0274155 A1 | 11/2007 | Ikelle | |
| 2008/0175101 A1 | 7/2008 | Saenger et al. | |
| 2008/0306692 A1 | 12/2008 | Singer et al. | |

(56) References Cited

U.S. PATENT DOCUMENTS

| | | |
|---|---|---|
| 2009/0006054 A1 | 1/2009 | Song |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0075516 A1 | 3/2011 | Xia et al. |
| 2011/0090760 A1 | 4/2011 | Rickett et al. |
| 2011/0131020 A1* | 6/2011 | Meng ............... G01V 1/303 703/2 |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0218737 A1 | 9/2011 | Gulati ............... 702/16 |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0090834 A1 | 4/2012 | Imhof et al. ............... 166/250.01 |
| 2012/0143506 A1 | 6/2012 | Routh et al. |
| 2012/0155217 A1* | 6/2012 | Dellinger ............... G01V 1/005 367/38 |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0060539 A1 | 3/2013 | Baumstein |
| 2013/0081752 A1 | 4/2013 | Kurimura et al. |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0039799 A1* | 2/2014 | Krohn ............... G01V 1/306 702/14 |
| 2014/0278115 A1 | 9/2014 | Bas et al. ............... 702/14 |
| 2014/0350861 A1 | 11/2014 | Wang et al. |
| 2014/0358504 A1 | 12/2014 | Baumstein et al. |
| 2014/0372043 A1 | 12/2014 | Hu et al. |
| 2015/0253445 A1 | 9/2015 | Luo et al. ............... G01V 1/345 |
| 2015/0362622 A1* | 12/2015 | Denli ............... G01V 99/005 703/2 |
| 2016/0091623 A1 | 3/2016 | Yu et al. |
| 2016/0170059 A1* | 6/2016 | Ramos-Martinez ... G01V 1/368 367/7 |
| 2016/0282490 A1* | 9/2016 | Qin ............... G01V 1/282 |
| 2016/0291178 A1* | 10/2016 | Xie ............... G01V 1/282 |
| 2017/0115418 A1* | 4/2017 | Gratacos ............... G01V 1/364 |

FOREIGN PATENT DOCUMENTS

| | | | |
|---|---|---|---|
| EP | 1 746 443 | 1/2007 | |
| GB | 2 390 712 | 1/2004 | |
| GB | 2 391 665 | 2/2004 | |
| WO | WO 2006/037815 | 4/2006 | |
| WO | WO 2007/046711 | 4/2007 | |
| WO | WO 2008/042081 | 4/2008 | |
| WO | WO 2008/123920 | 10/2008 | |
| WO | WO 2009/067041 | 5/2009 | |
| WO | WO 2009/117174 | 9/2009 | |
| WO | WO 2009/123790 | 10/2009 | |
| WO | WO 2010/085822 | 7/2010 | |
| WO | WO 2011/040926 | 4/2011 | |
| WO | WO 2011/091216 | 7/2011 | |
| WO | WO 2011/093945 | 8/2011 | |
| WO | WO 2012/024025 | 2/2012 | |
| WO | WO 2012/041834 | 4/2012 | |
| WO | WO 2012/083234 | 6/2012 | |
| WO | WO 2012/106201 | 8/2012 | ............... G01V 1/28 |
| WO | WO 2012/134621 | 10/2012 | |
| WO | WO 2012/170201 | 12/2012 | |
| WO | WO 2013/081752 | 6/2013 | |

OTHER PUBLICATIONS

Korsmo, Ø. et al. (Jun. 1, 2015), "Full Waveform Inversion—A Case Study Over the Valemon & Kvitebjørn Fields, Norwegian North," retrieved from the Internet: https://www.pgs./com/globalassets/technical-library/whitepapers-library/2015june_pgskorsmo_et_fwi.pdf, XP055322339, 5 pgs.

Lamont, M. (Aug. 15, 2014), "Q compensation PreSDM Case Study," retrieved from the Internet: https://web.archive.org/web/20140815020128/http://www.dugeo.com/images/uploads/Qcompl.pdf, XP05532250, 3 pgs.

U.S. Appl. No. 14/329,431, filed Jul. 11, 2014, Krohn et al.

U.S. Appl. No. 14/330,767, filed Jul. 14, 2014, Tang et al.

Bai, J., et al. (2014) "Viscoacoustic waveform inversion of velocity structures in the time domain", *Geophysics*, vol. 79, No. 3 (May-June) R103-R119.

Liu, J., et al. (2008) "Tomographic inversion by matrix transformation", *Geophysics*, 73(5), pp. 3350-3353.

Pratt, R.G., et al. (1998) "Gauss-Newton and full Newton methods in frequency-space seismic waveform inversion" *Geophysical Journal International*, 133, 341-362.

Tarantola, A., (1984), "Inversion of seismic reflection data in the acoustic approximation" *Geophysics*, vol. 49, No. 8 (August) pp. 1259-1266.

Zhou, J., et al. (2013) "FWI-guided Q tomography for imaging in the presence of complex gas clouds" 76th EAGE conference, pp. 4765-4769.

Gao, H. et al. (2008), "Implementation of perfectly matched layers in an arbitrary geometrical boundary for leastic wave modeling," *Geophysics J. Int.* 174, pp. 1029-1036.

Gibson, B. et al. (1984), "Predictive deconvolution and the zero-phase source," *Geophysics* 49(4), pp. 379-397.

(56) References Cited

OTHER PUBLICATIONS

Godfrey, R. J. et al. (1998), "Imaging the Foiaven Ghost," *SEG Expanded Abstracts*, 4 pgs.
Griewank, A. (1992), "Achieving logarithmic growth of temporal and spatial complexity in reverse automatic differentiation," 1 *Optimization Methods and Software*, pp. 35-54.
Griewank, A. (2000), Evaluating Derivatives: Principles and Techniques of Algorithmic Differentiation, Society for Industrial and Applied Mathematics, 49 pgs.
Griewank, A. et al. (2000), "Algorithm 799: An implementation of checkpointing for the reverse or adjoint mode of computational differentiation," 26 *ACM Transactions on Mathematical Software*, pp. 19-45.
Griewank, A. et al. (1996), "Algorithm 755: A package for the automatic differentiation of algorithms written in C/C++," *ACM Transactions on Mathematical Software* 22(2), pp. 131-167.
Haber, E. et al. (2010), "An effective method for parameter estimation with PDE constraints with multiple right hand sides," Preprint—UBC http://www.math.ubc.ca/~haber/pubs/PdeOptStochV5.pdf.
Hampson, D.P. et al. (2005), "Simultaneous inversion of pre-stack seismic data," SEG 75th Annual Int'l. Meeting, *Expanded Abstracts*, pp. 1633-1637.
Heinkenschloss, M. (2008), :"Numerical Solution of Implicity Constrained Optimization Problems," CAAM Technical Report TR08-05, 25 pgs.
Helbig, K. (1994), "Foundations of Anisotropy for Exploration Seismics," Chapter 5, pp. 185-194.
Herrmann, F.J. (2010), "Randomized dimensionality reduction for full-waveform inversion," *EAGE abstract* G001, EAGE Barcelona meeting, 5 pgs.
Holschneider, J. et al. (2005), "Characterization of dispersive surface waves using continuous wavelet transforms," *Geophys. J. Int.* 163, pp. 463-478.
Hu, L.Z. et al. (1987), "Wave-field transformations of vertical seismic profiles," *Geophysics* 52, pp. 307-321.
Huang, Y. et al. (2012), "Multisource least-squares migration of marine streamer and land data with frequency-division encoding," *Geophysical Prospecting* 60, pp. 663-680.
Igel, H. et al. (1996), "Waveform inversion of marine reflection seismograms for P impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and 70th Annual Meeting Expanded Abstracts*, pp. 786-789.
Kennett, B.L.N. (1991), "The removal of free surface interactions from three-component seismograms", *Geophys. J. Int.* 104, pp. 153-163.
Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," 70th SEG Ann. Meeting, *Expanded Abstracts*, pp. 1572-1575.

Lazaratos, S. et al. (2009), "Inversion of Pre-migration Spectral Shaping," 2009 SEG Houston Int'l. Expo. & Ann. Meeting, *Expanded Abstracts*, pp. 2383-2387.
Lazaratos, S. (2006), "Spectral Shaping Inversion for Elastic and Rock Property Estimation," *Research Disclosure*, Issue 511, pp. 1453-1459.
Lazaratos, S. et al. (2011), "Improving the convergence rate of full wavefield inversion using spectral shaping," *SEG Expanded Abstracts* 30, pp. 2428-2432.
Lecomte, I. (2008), "Resolution and illumination analyses in PSDM: A ray-based approach," The Leading Edge, pp. 650-663.
Lee, S. et al. (2010), "Subsurface parameter estimation in full wavefield inversion and reverse time migration," SEG Denver 2010 Annual Meeting, pp. 1065-1069.
Levanon, N. (1988), "Radar Principles," Chpt. 1, John Whiley & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007), "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Marcinkovich, C. et al. (2003), "On the implementation of perfectly matched layers in a three-dimensional fourth-order velocity-stress finite difference scheme," *J. of Geophysical Research* 108(B5), 2276.
Martin, G.S. et al. (2006), "Marmousi2: An elastic upgrade for Marmousi," *The Leading Edge*, pp. 156-166.
Meier, M.A. et al. (2009), "Converted wave resolution," *Geophysics*, 74(2):doi:10.1190/1.3074303, pp. Q1-Q16.
Moghaddam, P.P. et al. (2010), "Randomized full-wavefield inversion: a dimenstionality-reduction approach," 80th SEG Ann. Meeting, *Expanded Abstracts*, pp. 977-982.
Mora, P. (1987), "Nonlinear two-dimensional elastic inversion of multi-offset seismic data," *Geophysics* 52, pp. 1211-1228.
Abt, D.L. et al. (2010), "North American lithospheric discontinuity structured imaged by Ps and Sp receiver functions", *J. Geophys. Res.*, 24 pgs.
Akerberg, P., et al. (2008), "Simultaneous source separation by sparse radon transform," 78th SEG Annual International Meeting, *Expanded Abstracts*, pp. 2801-2805.
Aki, K. et al. (1980), "Quantitative Seismology: Theory and Methods vol. I—Chapter 7—Surface Waves in a Vertically Heterogenous Medium," W.H. Freeman and Co., pp. 259-318.
Aki, K. et al. (1980), "Quantitative Seismology: Theory and Methods vol. I," W.H. Freeman and Co., p. 173.
Aki et al. (1980), "Quantitative Seismology, Theory and Methods," Chapter 5.20, W.H. Freeman & Co., pp. 133-155.
Amundsen, L. (2001), "Elimination of free-surface related multiples without need of the source wavelet," *Geophysics* 60(1), pp. 327-341.
Anderson, J.E. et al. (2008), "Sources Near the Free-Surface Boundary: Pitfalls for Elastic Finite-Difference Seismic Simulation and Multi-Grid Waveform Inversion," 70th EAGE Conf. & Exh., 4 pgs.
Barr, F.J. et al. (1989), "Attenuation of Water-Column Reverberations Using Pressure and Velocity Detectors in a Water-Bottom Cable," 59th Annual SEG meeting, *Expanded Abstracts*, pp. 653-656.
Baumstein, A. et al. (2009), "Scaling of the Objective Function Gradient for Full Wavefield Inversion," SEG Houston 2009 Int'l. Expo and Annual Meeting, pp. 224-2247.
Beasley, C. (2008), "A new look at marine simultaneous sources," *The Leading Edge* 27(7), pp. 914-917.

(56) References Cited

OTHER PUBLICATIONS

Beasley, C. (2012), "A 3D simultaneous source field test processed using alternating projections: a new active separation method," *Geophsyical Prospecting* 60, pp. 591-601.
Beaty, K.S. et al. (2003), "Repeatability of multimode Rayleigh-wave dispersion studies," *Geophysics* 68(3), pp. 782-790.
Beaty, K.S. et al. (2002), "Simulated annealing inversion of multimode Rayleigh wave dispersion waves for geological structure," *Geophys. J. Int.* 151, pp. 622-631.
Becquey, M. et al. (2002), "Pseudo-Random Coded Simultaneous Vibroseismics," SEG Int'l. Exposition and 72th Annl. Mtg., 4 pgs.
Ben-Hadj-Ali, H. et al. (2009), "Three-dimensional frequency-domain full waveform inversion with phase encoding," *SEG Expanded Abstracts*, pp. 2288-2292.
Ben-Hadj-Ali, H. et al. (2011), "An efficient frequency-domain full waveform inversion method using simultaneous encoded sources," *Geophysics* 76(4), pp. R109-R124.
Benitez, D. et al. (2001), "The use of the Hilbert transform in ECG signal analysis," *Computers in Biology and Medicine* 31, pp. 399-406.
Berenger, J-P. (1994), "A Perfectly Matched Layer for the Absorption of Electromagnetic Waves," *J. of Computational Physics* 114, pp. 185-200.
Berkhout, A.J. (1987), "Applied Seismic Wave Theory," Elsevier Science Publishers, p. 142.
Berkhout, A.J. (1992), "Areal shot record technology," *Journal of Seismic Exploration* 1, pp. 251-264.
Berkhout, A.J. (2008), "Changing the mindset in seismic data acquisition," *The Leading Edge* 27(7), pp. 924-938.
Beylkin, G. (1985), "Imaging of discontinuities in the inverse scattring problem by inversion of a causal generalized Radon transform," *J. Math. Phys.* 26, pp. 99-108.
Biondi, B. (1992), "Velocity estimation by beam stack," *Geophysics* 57(8), pp. 1034-1047.
Bonomi, E. et al. (2006), "Wavefield Migration plus Monte Carlo Imaging of 3D Prestack Seismic Data," *Geophysical Prospecting* 54, pp. 505-514.
Boonyasiriwat, C. et al. (2010), 3D Multisource Full-Waveform using Dynamic Random Phase Encoding, SEG Denver 2010 Annual Meeting, pp. 1044-1049.
Boonyasiriwat, C. et al. (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," *Geophysics* 60, pp. 1457-1473.
Burstedde, G. et al. (2009), "Algorithmic strategies for full waveform inversion: 1D experiments," *Geophysics* 74(6), pp. WCC17-WCC46.
Chavent, G. et al. (1999), "An optimal true-amplitude least-squares prestack depth-migration operator," *Geophysics* 64(2), pp. 508-515.
Choi, Y. et al. (2011), "Application of encoded multisource waveform inversion to marine-streamer acquisition based on the global correlation," $73^{rd}$ EAGE Conference, Abstract, pp. F026.
Choi, Y et al. (2012), "Application of multi-source waveform inversion to marine stream data using the global correlation norm," *Geophysical Prospecting* 60, pp. 748-758.
Clapp, R.G. (2009), "Reverse time migration with random boundaries," SEG International Exposition and Meeting, *Expanded Abstracts*, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," *Geophysics* 70(1), pp. R1-R14.
Dickens, T.A. et al. (2011), RTM angle gathers using Poynting vectors, *SEG Expanded Abstracts* 30, pp. 3109-3113.
Donerici, B. et al. (1005), "Improved FDTD Subgridding Algorithms Via Digital Filtering and Domain Overriding," *IEEE Transactions on Antennas and Propagation* 53(9), pp. 2938-2951.
Downey, N. et al. (2011), "Random-Beam Full-Wavefield Inversion," 2011 San Antonio Annual Meeting, pp. 2423-2427.
Dunkin, J.W. et al. (1973), "Effect of Normal Moveout on a Seismic Pluse," *Geophysics* 38(4), pp. 635-642.
Dziewonski A. et al. (1981), "Preliminary Reference Earth Model", *Phys. Earth Planet. Int.* 25(4), pp. 297-356.
Ernst, F.E. et al. (2000), "Tomography of dispersive media," *J. Acoust Soc. Am* 108(1), pp. 105-116.
Ernst, F.E. et al. (2002), "Removal of scattered guided waves from seismic data," *Geophysics* 67(4), pp. 1240-1248.
Esmersoy, C. (1990), "Inversion of P and SV waves from multicomponent offset vertical seismic profiles", *Geophysics* 55(1), pp. 39-50.
Etgen, J.T. et al. (2007), "Computational methods for large-scale 3D acoustic finite-difference modeling: A tutorial," *Geophysics* 72(5), pp. SM223-SM230.
Fallat, M.R. et al. (1999), "Geoacoustic inversion via local, global, and hybrid algorithms," *Journal of the Acoustical Society of America* 105, pp. 3219-3230.
Fichtner, A. et al. (2006), "The adjoint method in seismology I. Theory," *Physics of the Earth and Planetary Interiors* 157, pp. 86-104.
Forbriger, T. (2003), "Inversion of shallow-seismic wavefields: I. Wavefield transformation," *Geophys. J. Int.* 153, pp. 719-734.
Ester, Martin; et al. (1996), "A Density-Based Algorithm for Discovering Clusters in Large Spatial Databases with Noise", Proc. of 2nd Intl. Conf. on Knowledge Discovery and Data Mining; 6 pages.
MacQueen, J. B. (1967). "Some Methods for classification and Analysis of Multivariate Observations". Proceedings of 5th Berkeley Symposium on Mathematical Statistics and Probability 1. University of California Press. pp. 281-297. MR 0214227. Zbl 0214. 46201, Retrieved Apr. 7, 2009.
Steinhaus, H. (1956) Original Article "Sur la division des corps materiels en parties". Bull. Acad. Polon. Sci. (in French) 4 (12): 801-804. MR 0090073, Zbl 0079.16403 with Machine Translation.

* cited by examiner

Q-COMPENSATED FULL WAVEFIELD INVERSION

CROSS REFERENCE TO RELATED APPLICATIONS

This application claims the benefit of U.S. Provisional Patent Application 62/236,190 filed Oct. 2, 2015 entitled Q-COMPENSATED FULL WAVEFIELD INVERSION, the entirety of which is incorporated by reference herein.

FIELD OF THE INVENTION

Exemplary embodiments described herein pertain to the field of geophysical prospecting, and more particularly to geophysical data processing. Specifically, embodiments described herein relate to a method for improving the accuracy of seismic data by compensating for subsurface anomalies.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

An important goal of seismic prospecting is to accurately image subsurface structures commonly referred to as reflectors. Seismic prospecting is facilitated by obtaining raw seismic data during performance of a seismic survey. During a seismic survey, seismic energy is generated at ground level by, for example, a controlled explosion, and delivered to the earth. Seismic waves are reflected from underground structures and are received by a number of sensors referred to as geophones. The seismic data received by the geophones is processed in an effort to create an accurate mapping of the underground environment. The processed data is then examined with a goal of identifying geological formations that may contain hydrocarbons.

Seismic energy that is transmitted in a relatively vertical direction into the earth is the most likely to be reflected by reflectors. Such energy provides meaningful information about subsurface structures. However, the seismic energy may be undesirably diffused by anomalies in acoustic impedance that routinely occur in the subsurface environment. Diffusion of seismic energy during a seismic survey may cause subsurface features to be incorrectly represented in the resulting seismic data.

Acoustic impedance is a measure of the ease with which seismic energy travels through a particular portion of the subsurface environment. Those of ordinary skill in the art will appreciate that acoustic impedance may be defined as a product of density and seismic velocity. Acoustic impedance is typically referred to by the symbol Z.

Seismic waves attenuate for a variety of reasons as they travel in a subsurface environment. A quality metric (sometimes referred to a quality factor) Q is typically used to represent attenuation characteristics of underground formations. In general, Q is inversely proportional to seismic signal attenuation and may range from a value of zero to infinity. More specifically, Q is a dimensionless quality factor that is a ratio of the peak energy of a wave to the dissipated energy. As waves travel, they lose energy with distance and time due to spherical divergence and absorption. Such energy loss must be accounted for when restoring seismic amplitudes to perform fluid and lithologic interpretations, such as amplitude versus offset (AVO) analysis. Structures with a relatively high Q value tend to transmit seismic waves with little attenuation. Structures that tend to attenuate seismic energy to a greater degree have lower Q values.

Q values associated with subsurface structures are used to mathematically alter seismic data values to more accurately represent structures in the subsurface environment. This process may be referred to as "Q migration" by those of ordinary skill in the art. During Q migration, a seismic data value representing travel of seismic energy through a subsurface structure having a relatively low Q value may be amplified and broadened in spectrum to a greater degree than a data value representing travel of seismic energy through a subsurface structure having a relatively high Q value. Altering the amplitude and phase of data associated with low Q values takes into account the larger signal attenuation that occurs when seismic energy travels through structures having a relatively low Q value.

FWI is a partial-differential-equation-constrained optimization method which iteratively minimizes a norm of the misfit between measured and computed wavefields. Seismic FWI involves multiple iterations, and a single iteration can involve the following computations: (1) solution of the forward equations, (2) solution of the adjoint equations, and (3) convolutions of these forward and adjoint solutions to yield a gradient of the cost function. Note that for second-order optimization methods, such as Gauss-Newton, the (4) solution of the perturbed forward equations is also required. A more robust mathematical justification for this case can be found, for example, in U.S. Patent Publication 2013/0238246, the entire content of which is hereby incorporated by reference.

A conventional first-order form of the linear visco-acoustic wave equations for simulating waves in attenuating acoustic media is:

$$\frac{\partial p}{\partial t} + \kappa \nabla \cdot v + \sum_{l=1}^{L} \phi_l m_l = s_p, \qquad (1)$$

$$\frac{\partial v}{\partial t} + \frac{1}{\rho} \nabla p = s_v,$$

$$\frac{\partial m_l}{\partial t} + \kappa \alpha_l \nabla \cdot v + \phi_l m_l = 0,$$

with appropriate initial and boundary conditions for pressure p, velocity v, and memory variables $m_l$. Note that $\nabla$=divergence operator, $\kappa$=unrelaxed bulk modulus $$\left( \lim_{\omega \to \infty} \kappa(\omega) \to \kappa \right),$$

$\rho$=mass density, v=velocity (v=$\{v_x\ v_y\ v_z\}^T$ in 3D space), p=pressure, $m_l$=memory variable for mechanism l, $s_p$=pressure source, $s_v$=velocity source, $$\phi_l = \frac{1}{\tau_{\sigma l}} \text{ and } \alpha_l = \left(1 - \frac{\tau_{\sigma l}}{\tau_{\epsilon l}}\right)$$

where relaxation parameters $\tau_{\epsilon l}$ and $\tau_{\sigma l}$ may be determined by equation (2) for a given quality factor profile.

Note that continuous scalar variables are denoted by italicized characters and vector and matrices are denoted by bold non-italicized characters throughout this document.

$$Q^{-1}(x, \omega) = \frac{\sum_{l=1}^{L} \frac{\omega(\tau_{\epsilon l}(x) - \tau_{\sigma l}(x))}{1 + \omega^2(\tau_{\sigma l}(x))^2}}{\sum_{l=1}^{L} \frac{1 + \omega^2 \tau_{\epsilon l}(x)\tau_{\sigma l}(x)}{1 + \omega^2(\tau_{\sigma l}(x))^2}} \quad (2)$$

where
Q=quality factor,
$\tau_{\epsilon l}$=strain relaxation time of mechanism l in SLS model,
$\tau_{\sigma l}$=stress relaxation time of mechanism l in SLS model,
x=spatial coordinate,
$\omega$=frequency,
L=number of relaxation mechanisms used in the SLS model.

Conceptually, the quality factor Q represents the ratio of stored to dissipated energy in a medium. The strain and stress relaxation times are determined to best fit the desired quality factor distribution over the frequency band.

Full wavefield inversion (FWI) methods based on computing gradients of an objective function with respect to the parameters are often efficiently implemented by using adjoint methods, which have been proved to outperform other relevant methods, such as direct sensitivity analyses, finite differences or complex variable methods.

The continuous adjoint of the conventional visco-acoustic system (Equations (1)) is $$\frac{\partial \bar{p}}{\partial t} + \nabla \cdot \left(\frac{1}{\rho}\bar{v}\right) = \frac{\partial \mathcal{F}}{\partial p}, \quad (3)$$

$$\frac{\partial \bar{v}}{\partial t} + \nabla(\kappa \bar{p}) + \sum_{l=1}^{L} \nabla(\kappa \alpha_l \bar{m}_l) = \frac{\partial \mathcal{F}}{\partial v},$$

$$\frac{\partial \bar{m}_l}{\partial t} + \phi_l \bar{p} + \phi_l \bar{m}_l = 0,$$

where
$\bar{p}$=adjoint pressure,
$\bar{v}$=adjoint velocity,
$\bar{m}_l$=adjoint memory variable for mechanism l, and
$\partial \mathcal{F}/\partial p$ and $\partial \mathcal{F}/\partial v$ are derivatives of the objective function $\mathcal{F}$ with respect to the pressure and velocity respectively.

A common iterative inversion method used in geophysics is cost function optimization. Cost function optimization involves iterative minimization or maximization of the value of a cost function $\mathcal{F}(\theta)$ with respect to the model $\theta$. The cost function, also referred to as the objective function, is a measure of the misfit between the simulated and observed data. The simulations (simulated data) are conducted by first discretizing the physics governing propagation of the source signal in a medium with an appropriate numerical method, such as the finite difference or finite element method, and computing the numerical solutions on a computer using the current geophysical properties model.

The following summarizes a local cost function optimization procedure for FWI: (1) select a starting model; (2) compute a search direction $S(\theta)$; and (3) search for an updated model that is a perturbation of the model in the search direction.

The cost function optimization procedure is iterated by using the new updated model as the starting model for finding another search direction, which will then be used to perturb the model in order to better explain the observed data. The process continues until an updated model is found that satisfactorily explains the observed data. Commonly used local cost function optimization methods include gradient search, conjugate gradients, quasi-Newton, Gauss-Newton and Newton's method.

Local cost function optimization of seismic data in the acoustic approximation is a common geophysical inversion task, and is generally illustrative of other types of geophysical inversion. When inverting seismic data in the acoustic approximation, the cost function can be written as:

$$\mathcal{F}(\theta) = \frac{1}{2} \sum_{g=1}^{N_g} \sum_{r=1}^{N_r} \sum_{t=1}^{N_t} W(\psi_{calc}(\theta, r, t, w_g) - \psi_{obs}(r, t, w_g)), \quad (4)$$

where
$\mathcal{F}(\theta)$=cost function,
$\theta$=vector of N parameters, $(\theta_1, \theta_2, \ldots \theta_N)$ describing the subsurface model,
g=gather index,
$w_g$=source function for gather g which is a function of spatial coordinates and time, for a point source this is a delta function of the spatial coordinates,
$N_g$=number of gathers,
r=receiver index within gather,
$N_r$=number of receivers in a gather,
t=time sample index within a trace,
$N_t$=number of time samples,
W=norm function (minimization function, e.g. for least squares function $(x)=x^2$),
$\psi_{calc}$=calculated seismic data from the model $\theta$,
$\psi_{obs}$ measured seismic data (pressure, stress, velocities and/or acceleration).

The gathers, data from a number of sensors that share a common geometry, can be any type of gather (common midpoint, common source, common offset, common receiver, etc.) that can be simulated in one run of a seismic forward modeling program. Usually the gathers correspond to a seismic shot, although the shots can be more general than point sources. For point sources, the gather index g corresponds to the location of individual point sources. This generalized source data, $\psi_{obs}$ can either be acquired in the field or can be synthesized from data acquired using point sources. The calculated data $\psi_{calc}$ on the other hand can usually be computed directly by using a generalized source function when forward modeling.

FWI attempts to update the discretized model $\theta$ such that $\mathcal{F}(\theta)$ is a minimum. This can be accomplished by local cost function optimization which updates the given model $\theta^{(k)}$ as follows:

$$\theta^{(i+1)} = \theta^{(i)} + \gamma^{(i)} S(\theta^{(i)}), \quad (5)$$

where i is the iteration number, $\gamma$ is the scalar step size of the model update, and $S(\theta)$ is the search direction. For steepest descent, $S(\theta) = -\nabla_\theta \mathcal{F}(\theta)$, which is the negative of the gradient of the misfit function taken with respect to the model parameters. In this case, the model perturbations, or the values by which the model is updated, are calculated by multiplication of the gradient of the objective function with a step length γ, which must be repeatedly calculated. For second-order optimization techniques, the gradient is scaled by the Hessian (second-order derivatives of objective function with respect to the model parameters). The computation of $\nabla_\theta \mathcal{F}(\theta)$ requires computation of the derivative of $\mathcal{F}(\theta)$ with respect to each of the N model parameters. N is usually very large in geophysical problems (more than one million), and this computation can be extremely time consuming if it has to be performed for each individual model parameter. Fortunately, the adjoint method can be used to efficiently perform this computation for all model parameters at once (Tarantola, 1984).

FWI generates high-resolution property models for prestack depth migration and geological interpretation through iterative inversion of seismic data (Tarantola, 1984; Pratt et al., 1998). With increasing computer resources and recent technical advances, FWI is capable of handling much larger data sets and has gradually become affordable in 3D real data applications. However, in conventional FWI, the data being inverted are often treated as they were collected in an acoustic subsurface medium, which is inconsistent with the fact that the earth is always attenuating. When gas clouds exist in the medium, the quality factor (Q) which controls the attenuation effect plays an important role in seismic wave propagation, leading to distorted phase, dim amplitude and lower frequency. Therefore, conventional acoustic FWI does not compensate the Q effect and cannot recover amplitude and bandwidth loss beneath gas anomalies.

Visco-acoustic FWI, on the other hand, uses both the medium velocity and the Q values in wave field propagation. Thus, the Q-effect is naturally compensated while wavefront proceeds. In some cases, where shallow gas anomalies overlay the reservoir, severe Q-effect screens off signals and causes cycle skipping issue in acoustic FWI implementation. Consequently, a visco-acoustic FWI algorithm and an accurate Q model are highly preferred.

The Q values, however, are not easy to determine. Among many approaches, ray-based refraction or reflection Q tomography has been largely investigated. In field data applications, however, Q tomography is a tedious process and the inversion is heavily depending on how to separate attenuated signals from their un-attenuated counterparts. In recent years, wave-based inversion algorithms such as FWI have been proposed to invert for Q values. Theoretically, such wave-based methods are more accurate. However, the velocity and the Q inversion may converge at a difference pace and there might be severe energy leakage between velocity and Q gradient so that the inversion results are not reliable.

Zhou et al., (2014) describes how to use acoustic FWI for velocity inversion and then how to use the FWI inverted velocity model for Q inversion. However, ray-based Q tomography is time consuming and they did not conduct a real visco-acoustic waveform inversion.

Bai et al., (2014) applied visco-acoustic FWI for velocity inversion, however, they also need to use visco-acoustic FWI to invert for the Q model. As commonly regarded by the industry, such a waveform Q inversion is very unstable. The errors in velocity inversion may easily leak into Q inversion, and vice versa. In addition, this method is hard to do target-oriented Q inversion and Q's resolution and magnitude remain an issue to be solved.

SUMMARY

A method, including: obtaining a velocity model generated by an acoustic full wavefield inversion process; generating, with a computer, a variable Q model by applying pseudo-Q migration on processed seismic data of a subsurface region, wherein the velocity model is used as a guided constraint in the pseudo-Q migration; and generating, with a computer, a final subsurface velocity model that recovers amplitude attenuation caused by gas anomalies in the subsurface region by performing a visco-acoustic full wavefield inversion process, wherein the variable Q model is fixed in the visco-acoustic full wavefield inversion process.

The method can further include generating a subsurface image based on the final subsurface velocity model.

The method can further include: generating the processed seismic data, wherein the generating includes applying an acoustic ray-based pre-stack depth migration to the velocity model and outputting common image gathers.

In the method, the generating the variable Q model includes flattening the common image gathers in accordance with the guided constraint.

In the method, the guided constraint defines a zone, within the velocity model, that contains a gas anomaly.

In the method, the pseudo Q migration is only applied to the zone that contains the gas anomaly.

In the method, the variable Q model is kept fixed through an entirety of the visco-acoustic full wavefield inversion process.

In the method, the generating the final subsurface velocity model includes applying pseudo-Q migration to construct another variable Q model via flattening visco-acoustic common image gathers, and the velocity model generated from the visco-acoustic full wavefield inversion process is used as a guided constraint in the pseudo-Q migration.

The method can further include iterative repeating, until a predetermined stopping condition is reached, performance of the visco-acoustic full wavefield inversion process, then generation of visco-acoustic common image gathers from visco-acoustic ray-based pre-stack depth migration, and then generation of another variable Q model via flattening the visco-acoustic common image gathers, wherein the velocity model generated from the visco-acoustic full wavefield inversion process is used as a guided constraint in the pseudo-Q migration.

The method can further include conducting a seismic survey, wherein at least one source is used to inject acoustic signals into the subsurface and at least one receiver is used to record the acoustic signals reflecting from subsurface features.

The method can further include using the final subsurface velocity model and the image of the subsurface to extract hydrocarbons.

The method can further include drilling a well to extract the hydrocarbons, wherein the well is disposed at a location determined by analysis of the subsurface image.

In the method, the guided constraint is guided by geological structures inverted from the acoustic full wavefield inversion process.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Exemplary embodiments described herein provide a comprehensive model building workflow, which effectively compensates for the Q-effect in FWI without suffering energy leakage and is capable of generating high-resolution property profiles with much improved subsurface fidelity.

Seismic waves propagating through gas clouds often result in distorted phase, dim amplitude and lower frequency. Acoustic FWI does not compensate for such Q effects, and thus cannot recover amplitude and bandwidth loss beneath gas anomalies. Non-limiting embodiments of the present technological advancement compensate for the Q-effect by combining ray-based Q-model building with visco-acoustic FWI. In ray-based Q-model building, pseudo-Q migration is used to efficiently scan all possible Q-values for the optimum Q-effect. Compared with other Q estimation methods like Q tomography or full wavefield Q inversion, pseudo-Q migration can scan within a target-oriented local gas area and the scan process is both efficient and stable.

In visco-acoustic FWI, the Q-effect is compensated for in both the forward modeling and the adjoint computation. Application of Q-compensated FWI to complex synthetic data has revealed clearly improved structures beneath the gas zone and the results definitely can benefit geological interpretation. The present technological advancement can be, in general, applied to any field data as long as the Q-effect is considered to be an issue. The present technological advancement is most applicable on the datasets where strong gas-anomalies exist in the subsurface and a conventional acoustic model building workflow cannot recover amplitude and bandwidth loss for the potential reservoir targets beneath the gas.

An embodiment of the present technological advancement provides a gas-friendly model building workflow that can include: ray-based pseudo-Q migration for efficient estimation of Q values; and wave-based visco-acoustic FWI for a Q compensated velocity update.

In visco-acoustic FWI, the Q-values are fixed and only the velocity gradient needs to be computed. Fixing the Q values throughout the entire FWI velocity inversion blocks the energy leakage for Q into velocity, which makes the inversion stable and the inverted velocity model reliable. Applications of Q-compensated FWI to synthetic and field data with gas clouds have shown improved structures and wellties beneath the gas and thus can positively impact geological interpretation.

Figure 1:
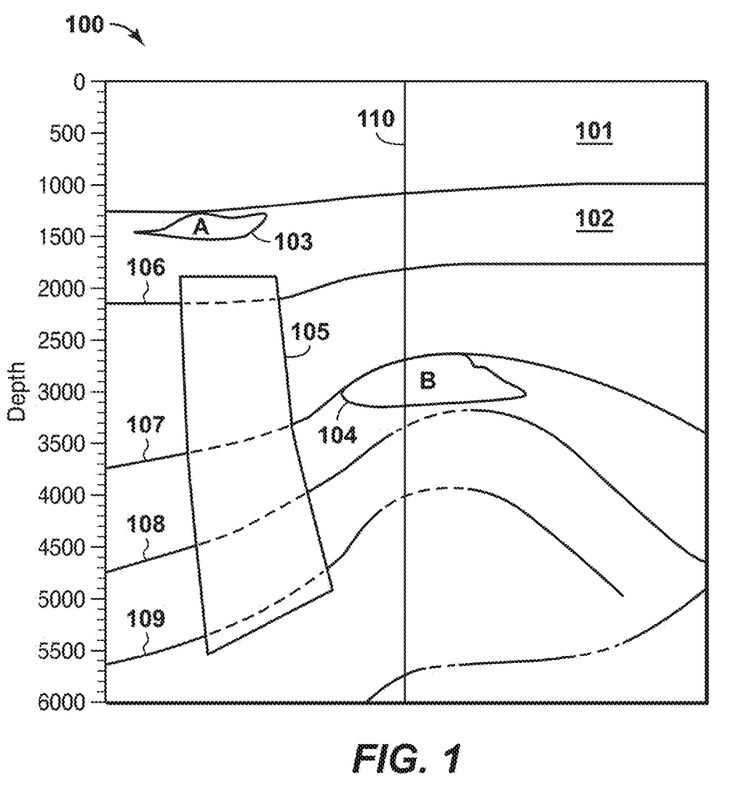
FIG. 1 is a graphical representation of a subsurface region that is useful in explaining the operation of an exemplary embodiment of the present invention

FIG. 1 is a graphical representation of a subsurface region that is useful in explaining the operation of an exemplary embodiment of the present technological advancement. The graph is generally referred to by the reference number 100. The graph 100 shows a water region 101 and a sediment region 102. Those of ordinary skill in the art will appreciate that the water region 101 exhibits a very high Q value, typically represented by a large number such as 999. Accordingly, seismic waves travel through the water region 101 with relatively little attenuation. The sediment region 102 may have a much lower Q value than the water region 101. For example, the Q value of the sediment region 102 may be in the range of about 150.

Subsurface anomalies such as gas caps or the like may have extremely low Q values. In the graph 100, an anomaly A 103 exhibits a Q value in the range of about 20. Similarly, an anomaly B 104 also exhibits a Q value in the range of about 20. The low Q values of the anomaly A 103 and the anomaly B 104 result in attenuated seismic data corresponding to deeper subsurface structures. By way of illustration, the anomaly A 103 negatively affects the integrity of seismic data in an anomaly attenuation region 105 that extends below the anomaly A 103. Any seismic energy that travels through the anomaly A 103 will be significantly attenuated when it returns to the surface and is measured. If the anomaly A 103 is disposed above a deposit of hydrocarbons, seismic data that could identify the presence of the deeper reservoir of hydrocarbons could be obscured. This phenomenon is shown in the graph 100 by a series of reflectors 106, 107, 108 and 109. Portions of the reflectors 106, 107, 108 and 109 that are likely to be represented by significantly attenuated seismic data are shown as dashed lines. Data corresponding to portions of the reflectors 106, 107, 108 and 109 that are unlikely to be significantly attenuated by the presence of the anomaly A 103 and the anomaly B 104 are shown as solid lines in FIG. 1. The performance of pseudo Q migration in accordance with an exemplary embodiment of the present invention is intended to restore accurate amplitude, frequency and phase data for seismic energy that is adversely affected by passing through the anomaly A 103 and the anomaly B 104.

Figure 2:
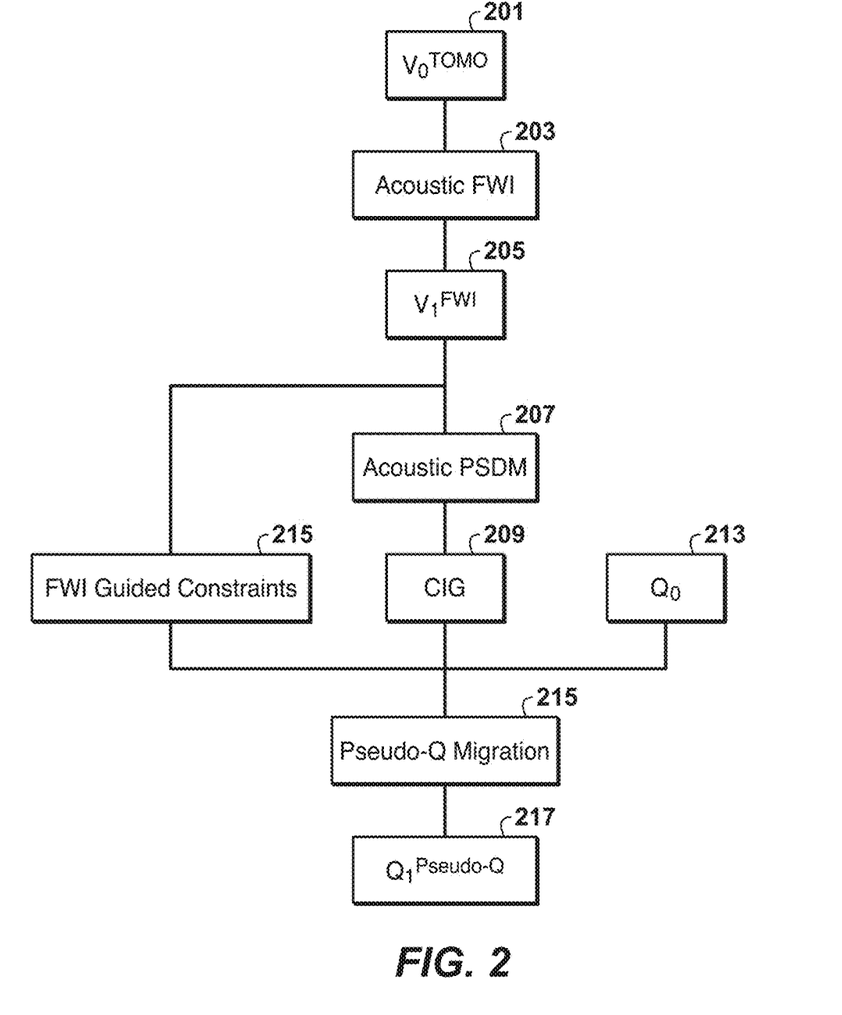
FIG. 2 illustrates an exemplary method of generating a starting velocity model and starting Q model.
Figure 3:
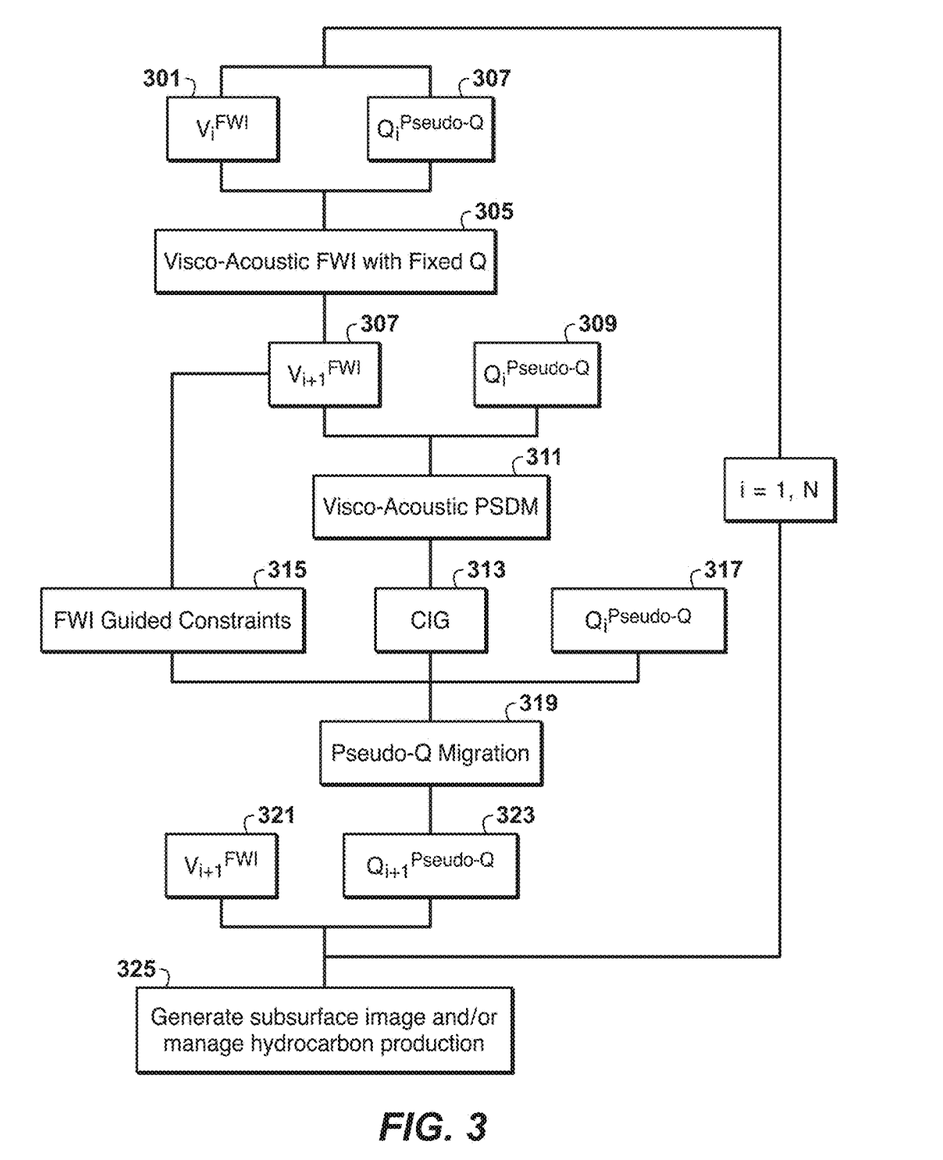
FIG. 3 illustrates an exemplary method of visco-acoustic FWI.

FIG. 2 illustrates an exemplary method of generating a starting velocity model and starting Q model, which are then used as inputs to the visco-acoustic FWI method (see FIG. 3). In step 201, an initial velocity model $V_0^{TOMO}$ is generated. The initial velocity model can be generated through ray-based tomography (Liu et al., 2008). However, other techniques could be used.

In step 203, acoustic FWI is applied using the initial velocity model. In step 205, a high resolution velocity distribution $V_1^{FWI}$ is generated from the acoustic FWI. The crux of any FWI algorithm can be described as follows: using a starting subsurface physical property model, synthetic seismic data are generated, i.e. modeled or simulated, by solving the wave equation using a numerical scheme (e.g., finite-difference, finite-element etc.). The term velocity model or physical property model as used herein refers to an array of numbers, typically a 3-D array, where each number, which may be called a model parameter, is a value of velocity or another physical property in a cell, where a subsurface region has been conceptually divided into discrete cells for computational purposes. The synthetic seismic data are compared with the field seismic data and using the difference between the two, an error or objective function is calculated. Using the objective function, a modified subsurface model is generated which is used to simulate a new set of synthetic seismic data. This new set of synthetic seismic data is compared with the field data to generate a new objective function. This process is repeated until the objective function is satisfactorily minimized and the final subsurface model is generated. A global or local optimization method is used to minimize the objective function and to update the subsurface model. Further details regarding FWI can be found in U.S. Patent Publication 2011/0194379 to Lee et al., the entire contents of which are hereby incorporated by reference.

In step 207, based on the FWI inverted velocity model $V_1^{FWI}$, an acoustic ray-based pre-stack depth migration (PSDM) is applied to compute common-image-gathers whose flatness reflects the accuracy of the velocity model and the Q model. Several pre-stack migration methods can be used to perform step 207, and include, for example, Kirchoff PSDM, one-way wave equation migration, and reverse time migration, each of which is known to those of ordinary skill in the art.

In step 209, the common image gathers (CIG) are provided as an input to the pseudo-Q migration. A common image gather is a collection of seismic traces that share some common geometric attribute, for example, common-offset or common angle.

In step 211, low velocity zones, which normally represent gas anomalies, are determined from $V_1^{FWI}$, and provided as an input to the pseudo-Q migration. At later stage where Q is being determined (see step 215), these low velocity zones are used as FWI guided constraints. Particularly, the FWI guided constraints delineate the regions of probable gas (targeted gas zones), and are used in the subsequent pseudo-Q migration to limit the pseudo-Q migration to only those regions likely to contain gas (as indicated by regions of low velocity in $V_1^{FWI}$). The guided constraints are guided by geological structures inverted from the acoustic full wavefield inversion process.

In step 213, $Q_o$ is obtained and provided as an input to the pseudo-Q migration. $Q_o$ can be an initial homogeneous Q model.

In step 215, pseudo-Q migration is applied to the regions or zones delineated by the FWI constraints. Pseudo-Q migration is different from Q tomography. Q tomography is a very tedious process which requires carefully preparing different input data. In addition, Q tomography is unstable when the signal/noise ratio of the common-image-angle is low. Pseudo-Q migration, however, is not only efficient, but is also stable since it is similar to a Q scan. Below is a brief overview of the theory of pseudo-Q migration. A fuller description of pseudo Q migration is found in International Patent Application Publication WO 2009/123790, the entire content of which is hereby incorporated by reference.

An aspect of pseudo-Q migration involves the building of a Q integration table that can be used to restore amplitude, frequency and phase values of data corresponding to a migrated trace. Q integration data is computed using the multiplication of a matrix (derivatives of Q integration with respect to a given Q model) and a vector (update of the Q model). The derivatives of Q integration may be computed in part by determining the rate of change in a velocity model. In an exemplary embodiment, the derivatives of the Q integration are desirably represented as a sparse matrix.

The derivative matrix is independent of Q model; therefore, it can be pre-calculated and stored for use with subsequently developed Q models. A table of Q integration is then calculated at each specific image point and for its reflection angle in a trace. Basically, pseudo Q migration in accordance with an exemplary embodiment includes a trace-in and trace-out operation; so the computation is essentially a 1D processing operation. Furthermore, pseudo Q migration can be implemented in target orientation. An input trace will be remigrated for amplitude and phase restoration only if it is predicted to be affected by a low Q zone such as the anomaly A attenuation region 105 (see FIG. 1).

By way of example, let c(x) be a complex velocity in a visco-acoustic velocity field versus the frequency variable ω. Under these assumptions, c(x) can be represented, as follows:

$$c(x) = c_o(x)\left(1 + \frac{1}{2}iQ^{-1}(x) + \frac{1}{\pi}Q^{-1}(x)\ln\frac{\omega}{\omega_o}\right) \quad (6)$$

where $c_0$ is the acoustic part of the complex velocity, Q is the quality factor representing attenuation, and $\omega_0$ is a reference frequency.

The complex travel time can be calculated by $$T_c(x) = T(x) - \frac{1}{2}iT^*(x) - \frac{1}{\pi}T^*(x)\ln\frac{\omega}{\omega_o} \quad (7)$$

where τ(x) is the travel time in the acoustic medium $c_0$ and $$T^*(x) = \int_L \frac{1}{C_o Q} ds \quad (8)$$

The first term in equation (6) contains the primary kinematic information in migration imaging and can be calculated by ray tracing in an acoustic medium. The second term in equation (6) permits migration to compensate for amplitude loss due to attenuation, and the third term in equation (6) permits migration to compensate for phase distortion due to dispersion. Both the second and third terms depend on T*, the integral of $Q^{-1}$ along the ray path L, as defined in equation (8). T* can be calculated on the same ray paths as used to calculate T. When Q is updated, T remains the same and the change of T* is $$\Delta T^* = \int c_o^{-1} \Delta(Q^{-1}) ds \quad (9)$$

Moreover, equation (9) may be rewritten into a matrix form:

$$\Delta T^* = D^* \Delta(Q^{-1}) \quad (10)$$

In equation (10), D is the matrix of derivatives of T* with respect to $Q^{-1}$ (the derivative values). As examples of terminology used herein, D contains "the derivatives of Q integration values based on a velocity model," where the term "Q integration values" is represented by equation (8) and $c_0$ refers to the velocity model. The matrix D can be pre-calculated and stored because it does not depend on a particular Q model.

Exemplary processing steps for pseudo Q migration can be stated as follows: (1) given migrated traces (common image gather or the processed seismic data), the velocity model used in the migration, and an initial Q model; (2) select reflection points and estimate reflection angles for those points; (3) compute the derivatives of Q integration with respect to the Q model (dT*/dQ) and output those derivatives; and (4) multiply the derivatives of Q integration by the initial Q model to obtain the table of Q integration ($Q_1^{Pseudo-Q}$).

With a simple homogeneous Q available as the initial $Q_o$ model, the process in FIG. 2 will determine and output an optimized variable Q model, $Q_1^{Pseudo-Q}$ (step 217), which is judged by most-effectively reducing the image gather's curvature (i.e., flatness). In each iteration of the pseudo-Q optimization, the ray path matrix is fixed and the Q-values are perturbed. Different from any inversion-based Q model building methods, pseudo-Q migration scans for available Q models within a reasonable range of Q values and performs the scan within an FWI guided target area (i.e., the areas identified by the FWI velocity model as being gas). Therefore, the resulted $Q_1^{Pseudo-Q}$ lacks local minima and is thus preferred by the later stage of visco-acoustic wavefield propagation (see FIG. 3).

A common feature of FIG. 2 is that every process can be acoustic. In FIG. 2, the whole process is intentionally kept independent of the Q factor. This acoustic process helps to build a more reliable starting Q model, which is able to improve over an acoustic model from the very beginning.

Outputs from the method in FIG. 2, are obtained and used as the starting models (steps 301 and 303) for the first iteration of the method in FIG. 3. In step 305, visco-acoustic FWI is performed with fixed Q (fixed does not mean constant as $Q_1^{Pseudo-Q}$ is variable, fixed rather refers to the use of the same variable Q model throughout each iteration i of the method shown in FIG. 3). As illustrated in FIG. 3, which uses both the velocity $V_1^{FWI}$ and the Q model $Q_1^{Pseudo-Q}$, visco-acoustic FWI automatically includes Q in its wavefield propagation and is able to effectively account for the attenuation effect. The Q model, however, is fixed in the visco-acoustic FWI process to avoid energy leakage between Q inversion and velocity inversion. Accordingly, only velocity gradient needs to be computed in the visco-acoustic FWI process.

In step 307, the updated velocity model is output for subsequent use in the visco-acoustic PSDM.

In step 309, the Q model $Q_1^{Pseudo-Q}$ is obtained for subsequent use in the visco-acoustic PSDM.

In step 311, visco-acoustic PSDM is applied using the updated velocity model from step 307 and the Q model from step 309. Visco-acoustic Kirchoff migration is the most widely used method to generate visco-acoustic PSDM gathers and stacks.

In step 313, common image gathers (CIG) are output from the visco-acoustic PSDM.

Similar to step 211 in FIG. 2, step 315 includes using the FWI inverted velocity model (from step 307) to determine gas anomalies (based on regions of attenuated velocity), said anomalies being useable as guided constraints for the pseudo-Q inversion.

In step 317, the Q model $Q_1^{Pseudo-Q}$ is obtained for subsequent use in the pseudo-Q migration.

In step 319, pseudo-Q migration stably scans for optimum Q values to further minimize the image gather curvatures. By scan, the process can cycle through a plurality of Q values and determine which of the plurality is the optimum solution. Pseudo-Q migration is discussed supra, and that discussion is applicable to the performance of this step.

The workflow in FIG. 3 updates velocity and Q models iteratively and stops at the predetermined iteration i=N, which can be specified by the user. Alternatively, other stopping criteria could be used.

It is noted that the index "i" is for the big hybrid loop of the method in FIG. 3, and not the iteration number of the FWI step 305. As those of ordinary skill in the art will understand, FWI is itself an iterative process.

A common feature of FIG. 3 is that every process can be visco-acoustic. In FIG. 3, both depth migration and FWI use a visco-acoustic engine to guarantee that the wave-propagation is consistent.

Once the iterations over the overall process in FIG. 3 are completed (i.e., N iterations are completed), the output from FIG. 3 is a final subsurface velocity model (or physical property model) and a final Q model (steps 321 and 323. The final physical property subsurface model can be used to generate a subsurface image for interpretation of the subsurface and/or management of hydrocarbon exploration (step 325). Application of Q-compensated FWI to complex synthetic data has revealed clearly improved structures beneath the gas zone and the results definitely can benefit geological interpretation. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

The following describes a non-limiting example of an application of the present technological advancement.

Figure 4A:
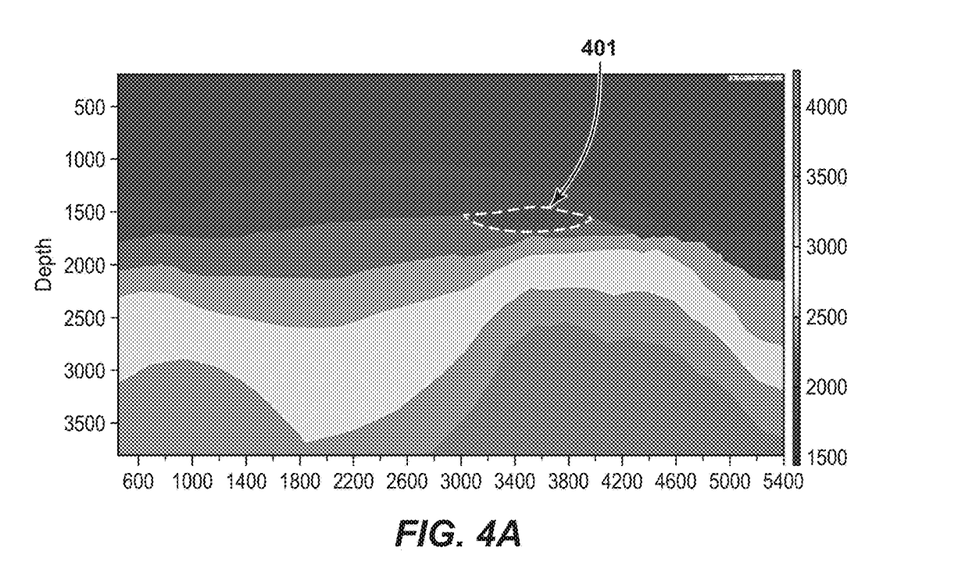
FIG. 4A illustrates an exemplary velocity model.

The methods of FIGS. 2 and 3 have been applied to 2-D synthetic streamer data. FIG. 4A illustrates an exemplary velocity model. FIG. 4A is a true underground model from which forward modeling can be applied to generate synthetic data. The velocity model in FIG. 4A was modified from a deep-water field geology scenario where a gas zone is located close to the water bottom and has made conventional depth imaging and model building very challenging in the beneath reservoir area.

Figure 4B:
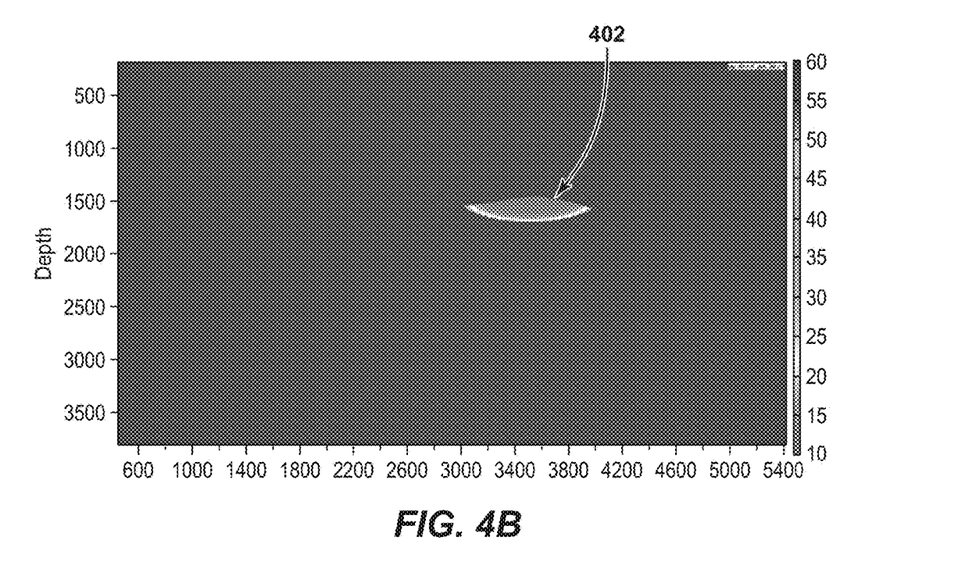
FIG. 4B illustrates an exemplary Q model to match a gas cloud in FIG. 4A.

To parallel with the low velocity gas zone 401, a Q anomaly 402 is created as shown in FIG. 4B. Similar to FIG. 4A, FIG. 4B is also used in visco-acoustic modeling to compute synthetic data.

Figure 5A:
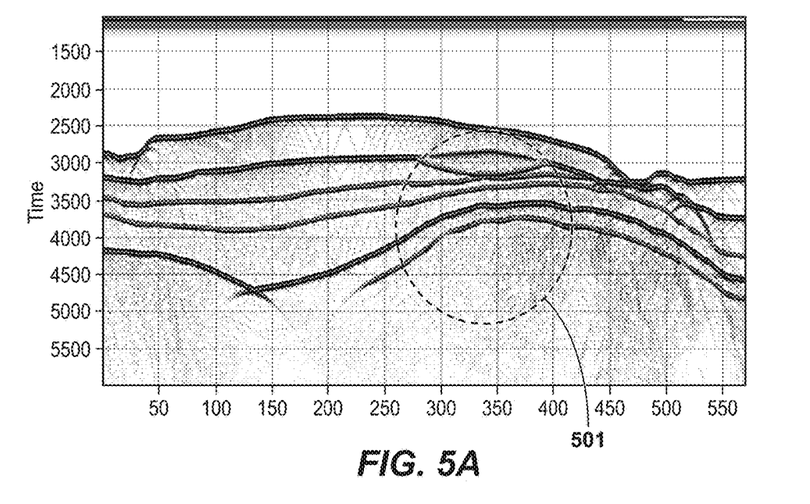
FIG. 5A illustrates exemplary common offset data generated by acoustic forward modeling.
Figure 5B:
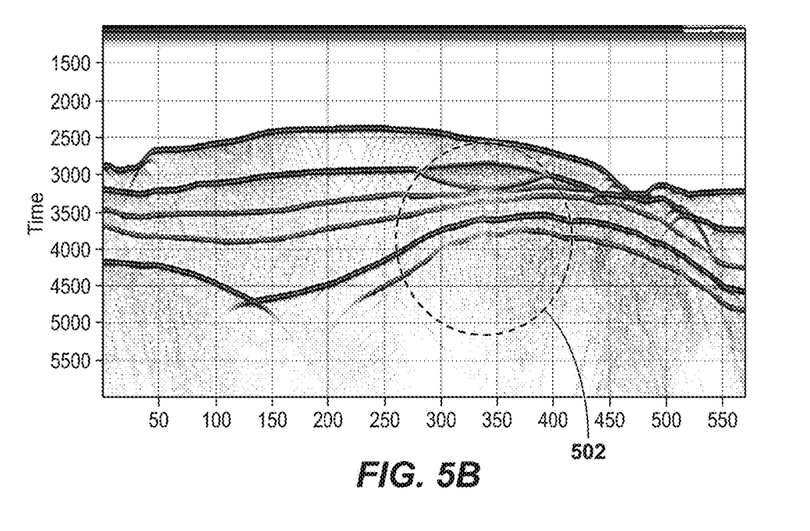
FIG. 5B illustrates exemplary common offset data generated by visco-acoustic forward modeling.

FIG. 5A shows the near-offset data generated from acoustic forward modeling (common offset data, with offset=100 m) using the velocity model in FIG. 4A, whereas FIG. 5B shows similar data generated from visco-acoustic modeling using both velocity and Q anomalies. In the circled areas 501 and 502, events are attenuated due to the absorption effect of the gas. Compared with FIG. 5A, the only difference in FIG. 5B is in the gas area where phases are distorted and amplitudes are attenuated. The difference between FIGS. 5A and 5B demonstrates the Q-attenuation effect. FIG. 5B clearly has low quality because of Q.

Figure 6A:
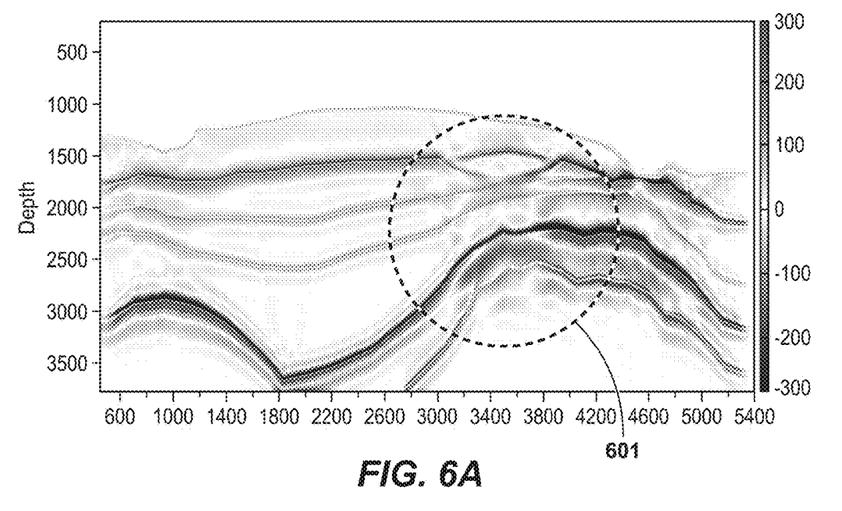
FIG. 6A illustrates an exemplary velocity update generated from acoustic FWI.
Figure 6B:
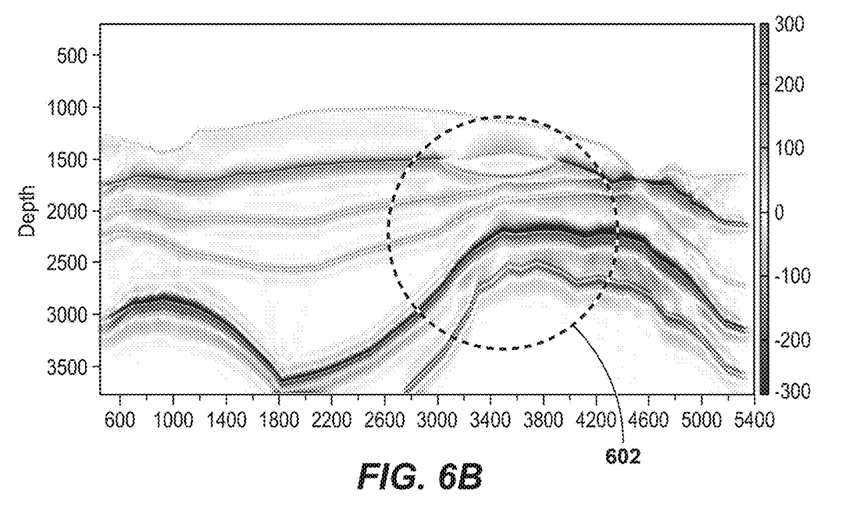
FIG. 6B illustrates an exemplary velocity update generated from visco-acoustic FWI with Q values fixed.

FIG. 6A shows the velocity update inverted from acoustic FWI (i.e., step 203) and FIG. 6B shows the velocity update inverted from visco-acoustic FWI (i.e., step 305) with Q values fixed. In both FWI, the synthetic visco-acoustic data were used as the observed data. FIGS. 6A and 6B demonstrates that including Q or not in FWI has significant impacts on the velocity inversion. For this specific case, including fixed Q in FWI clearly improves the velocity update in the target gas area (compare 601 and 602). The same workflow has also been applied to 3-D marine field data and FWI with fixed Q generated visiably better geological structures compared to acoustic FWI.

In all practical applications, the present technological advancement must be used in conjunction with a computer, programmed in accordance with the disclosures herein. Preferably, in order to efficiently perform FWI, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following references are hereby incorporated by reference in their entirety:

Bai, J., Yingst, D., Bloor, R., Leveille, J., 2014, Viscoacoustic waveform inversion of velocity structures in the time domain, Geophysics, 79, R103-R119;

Liu, J., 2007, Method for performing pseudo-Q migration of seismic data, International Patent Publication WO2009/123790;

Liu, J., Bear, L., Krebs, J., Montelli, R., and Palacharla, G., 2008, Tomographic inversion by matrix transformation, Geophysics, 73(5), VE35-VE38;

Pratt, R. G., Shin, C., and Hicks, G. J., 1998, Gauss-Newton and full Newton methods in frequency-space seismic waveform inversion: Geophysical Journal International, 133, 341-362;

Tarantola, A., 1984, Inversion of seismic reflection data in the acoustic approximation: Geophysics, 49, 1259-1266; and Zhou, J., Wu, X., Teng, K., Xie, Y., Lefeuvre, F., Anstey, I., Sirgue, L., 2014, FWI-guided Q tomography for imaging in the presence of complex gas clouds, $76^{th}$ EAGE conference.

What is claimed is:

1. A method, comprising:
    obtaining a velocity model generated by an acoustic full wavefield inversion process;
    generating, with a computer, a variable Q model by applying pseudo-Q migration on processed seismic data of a subsurface region, wherein the velocity model is used as a guided constraint in the pseudo-Q migration;
    generating, with a computer, a final subsurface velocity model that recovers amplitude attenuation caused by a gas anomaly in the subsurface region by performing a visco-acoustic full wavefield inversion process, wherein the variable Q model is fixed in the visco-acoustic full wavefield inversion process;
    generating a subsurface image based on the final subsurface velocity model, wherein the subsurface image includes geological structure beneath the gas anomaly; and
    drilling a well to extract the hydrocarbons, wherein the well is disposed at a location determined by analysis of the subsurface image.

2. The method of claim 1, further comprising: generating the processed seismic data, wherein the generating includes applying an acoustic ray-based pre-stack depth migration to the velocity model and outputting common image gathers.

3. The method of claim 2, wherein the generating the variable Q model includes flattening the common image gathers in accordance with the guided constraint.

4. The method of claim 2, wherein the guided constraint defines a zone, within the velocity model, that contains the gas anomaly.

5. The method of claim 4, wherein the pseudo Q migration is only applied to the zone that contains the gas anomaly.

6. The method of claim 4, further comprising limiting application of the pseudo-Q migration to the zone that contains the gas anomaly.

7. The method of claim 1, wherein the variable Q model is kept fixed through an entirety of the visco-acoustic full wavefield inversion process.

8. The method of claim 1, wherein the generating the final subsurface velocity model includes applying pseudo-Q migration to construct another variable Q model via flattening visco-acoustic common image gathers, and the velocity model generated from the visco-acoustic full wavefield inversion process is used as a guided constraint in the pseudo-Q migration.

9. The method of claim 1, further comprising iterative repeating
    (a) performance of the visco-acoustic full wavefield inversion process,
    (b) then generation of visco-acoustic common image gathers from visco-acoustic ray-based pre-stack depth migration, and
    (c) then generation of another variable Q model via flattening the visco-acoustic common image gathers,
    said iterative repeating occurring until a predetermined stopping condition is reached, wherein the velocity model generated from the visco-acoustic full wavefield inversion process is used as a guided constraint in the pseudo-Q migration.

10. The method of claim 1, further comprising conducting a seismic survey, wherein at least one source is used to inject acoustic signals into the subsurface and at least one receiver is used to record the acoustic signals reflecting from subsurface features.

11. The method of claim 1, wherein the guided constraint is guided by geological structures inverted from the acoustic full wavefield inversion process.

\* \* \* \* \*